(12) United States Patent
Wuester, Sr. et al.

(10) Patent No.: US 8,800,409 B1
(45) Date of Patent: Aug. 12, 2014

(54) LOW ASPECT RATIO SCREW FINDER FOR RECEIPT OF A SCREW FOR DISK DRIVE ASSEMBLY

(75) Inventors: David Wuester, Sr., Chandler, AZ (US); Jambunathan Vangal-Ramamurthy, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 645 days.

(21) Appl. No.: 13/098,278

(22) Filed: Apr. 29, 2011

(51) Int. Cl.
*B25B 17/00* (2006.01)

(52) U.S. Cl.
USPC ................. 81/57.37; 81/430; 81/433; 81/451

(58) Field of Classification Search
USPC .................................. 81/57.37, 430, 433, 451
See application file for complete search history.

(56) References Cited

U.S. PATENT DOCUMENTS

| | | | | |
|---|---|---|---|---|
| 2,657,721 A | * | 11/1953 | Shaff | 81/430 |
| 3,583,451 A | * | 6/1971 | Dixon et al. | 81/57.37 |
| 8,230,570 B1 | * | 7/2012 | Choong | 29/407.02 |

\* cited by examiner

*Primary Examiner* — Lee D Wilson
*Assistant Examiner* — Shantese McDonald

(57) ABSTRACT

Disclosed is low aspect ratio screw finder for receipt and optimal alignment of a screw. The screw finder may be used in conjunction with a complete screw bit assembly including a screw insertion assembly and a driver. The screw finder includes a screw guide, a screw guide sleeve, and a retraction mechanism. The screw guide is coupled to the screw guide sleeve for movement relative to the screw guide sleeve and provides a surface to abut against the screw to maintain the screw in an optimal orientation for movement from the tube into a bottom portion of the screw insertion assembly. The retraction mechanism retracts the screw guide towards the screw guide sleeve to allow the screw to enter the bottom portion of the screw insertion assembly and to allow the driver to extend through the bottom portion of the screw insertion assembly to engage the head of the screw.

14 Claims, 6 Drawing Sheets

LOW ASPECT RATIO SCREW FINDER FOR RECEIPT OF A SCREW FOR DISK DRIVE ASSEMBLY

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks.

The term computing device generally refers to desktop computers, server computers, laptop computers, mobile computing devices (e.g., personal digital assistants (PDAs), cell-phones, etc.), as well as any other type of computer system. A computing device typically includes a processor and a memory as well as other types of electronic devices, such as, a disk drive.

Disk drives typically employ a moveable head actuator to frequently access large amounts of data stored on a disk. One example of a disk drive is a hard disk drive. A conventional hard disk drive has a head disk assembly ("HDA") including at least one magnetic disk ("disk"), a disk clamp and a disk fastener (or screw) to mount the disk to a spindle motor that rapidly rotates the disk, and a head stack assembly ("HSA") that includes a moveable actuator arm and a head gimbal assembly ("HGA") with a moveable transducer head for reading and writing data. The HSA forms part of a servo control system that positions the moveable head over a particular track on the disk to read or write information from and to that track, respectively.

Due to the cost competiveness of the disk drive industry, the components of a disk drive need to be assembled in a very precise and cost effective manner. In order to be cost effective, complex components of the disk drive, such as disk clamps, disks, spindle motors, HDAs, HGAs, etc., need to be assembled, with fasteners, such as screws, in a very time effective manner with a very low error rate—even though many of the components require highly precise assembly. Also, many of these types of components often need to be assembled in a very clean fashion in which debris and contamination particles are kept to a minimum. Further, as disk drives are being actively utilized more and more both as moveable external disk drives and/or for use in smaller computing devices such as laptops and mobile devices (e.g. PDAs, cell-phones, etc.), they are increasingly requiring smaller and smaller components for assembly.

In particular, for small-form-factor mobile and enterprise hard disk drives, the assembly process is requiring the use of smaller and smaller screws. These smaller screws are becoming very difficult to feed with currently utilized feeding mechanisms in current screw bit finders because of the screw height to head diameter ratio (i.e., the aspect ratio). In fact, many of the new small-form-factor disk drives are beginning to utilize screws with an aspect ratio close to 1.0 (i.e., a low aspect ratio), which are encountering many problems in the assembly process utilizing current screw bit finders.

Newer small-form-factor disk drives need to be assembled with more reliability, performance, and compactness and utilize new screws with low aspect ratios. Unfortunately, existing feeding mechanisms in existing screw bit finders, when utilizing low aspect ratio screws, have encountered many problems in that the low aspect ratio screws are often flipped and delivered upside down which damages the manufacturing process and/or the disk drive. Common problems that occur with existing feeder mechanisms in current screw bit finders when utilizing low aspect ratio screws in the manufacturing of small-form-factor disk drives include: flipped screws; screws that get stuck in the feeding mechanism—which causes interruption and down time; contamination that is generated due to flipped screws and slanted screws; and the reduction in disk drive yield due to all of these problems.

Accordingly, a screw finder that may be utilized with low aspect ratio screws in order to reduce: potential screw jams; particle contamination; and machine down time; for the manufacture of small-form-factor disk drives, is sought after.

DETAILED DESCRIPTION

Figure 1A:
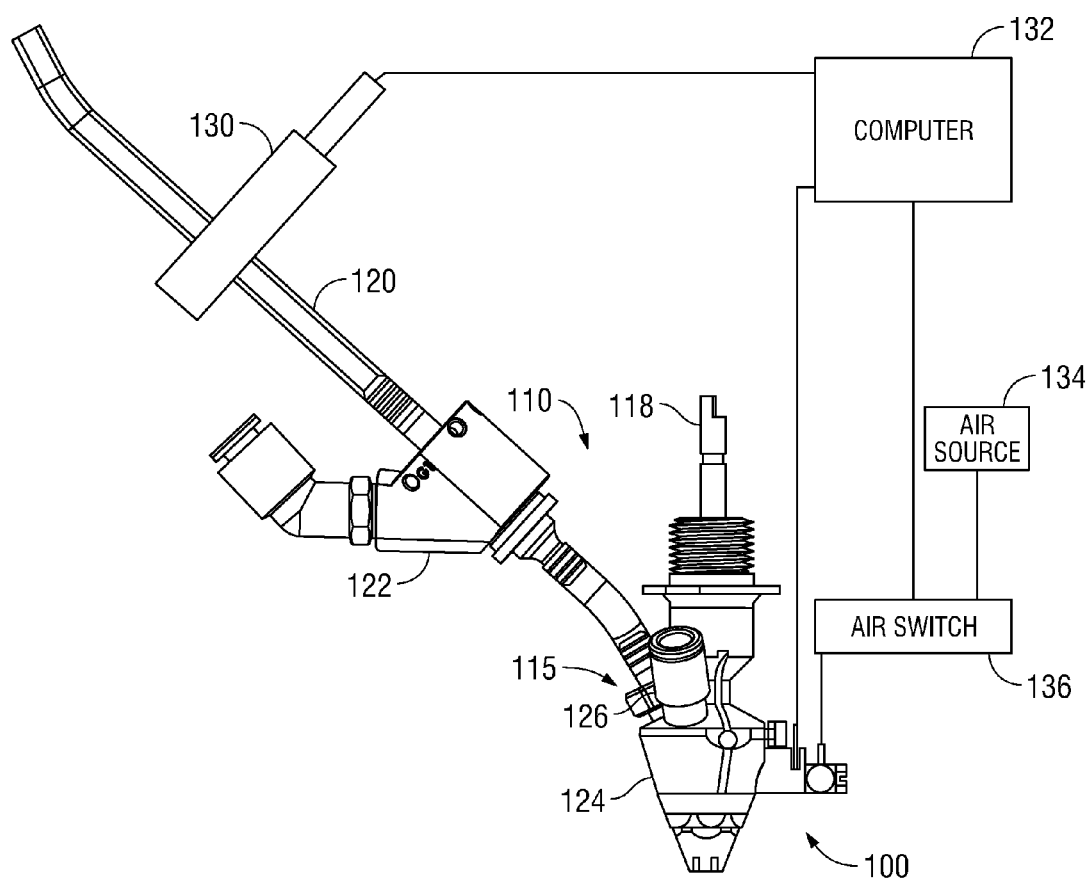
FIG. 1A is a side view of a complete screw bit assembly including a low aspect ratio screw finder, according to one embodiment of the invention.
Figure 1B:
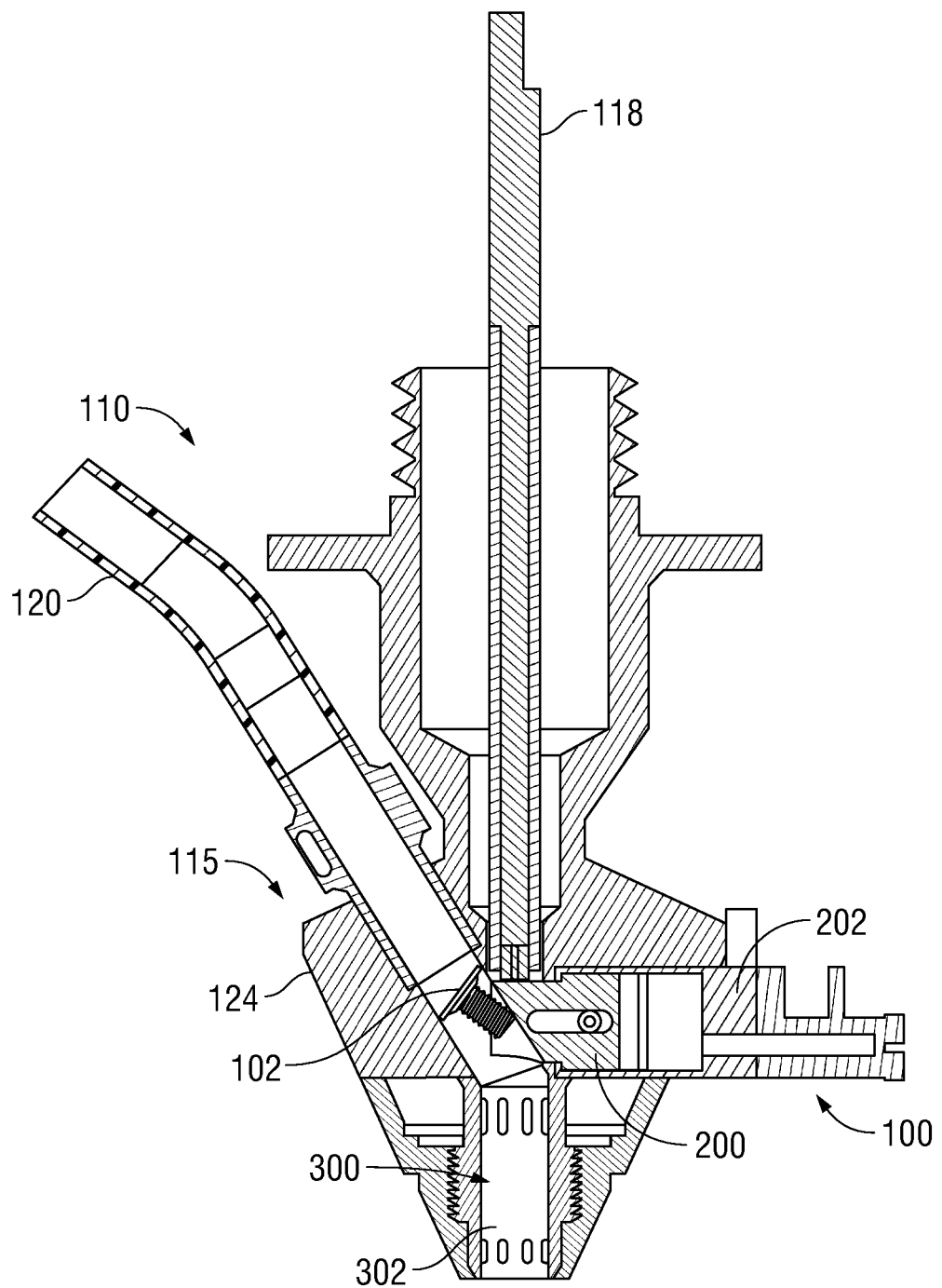
FIG. 1B is a side cross-sectional view of a complete screw bit assembly including a low aspect ratio screw finder, according to one embodiment of the invention.

With reference to FIGS. 1A and 1B, a low aspect ratio screw finder 100, according to one embodiment of the invention, will be hereinafter described. The low aspect ratio screw finder 100 is for receipt and optimal alignment of a screw 102. The low aspect ratio screw finder 100 is for use in conjunction with a complete screw bit finder 110 that includes a screw insertion assembly 115 and a driver 118 for driving screws 102 into components of a disk drive for the manufacturing of a disk drive. Complete screw bit finders that include screw insertion assemblies and drivers are presently utilized in disk drive manufacturing—but do not include the use of a low aspect ratio screw finder 100, according to embodiments of the invention.

As an example, a screw insertion assembly 115 may include a tube 120 that sucks down screws 102 through the tube 120 by applying a vacuum to the tube 120 through vacuum connectors 122 and 126 from a vacuum source (not shown) into a conically-shaped screw insertion assembly housing 124. Drivers 118 (e.g., with a torx bit) may be utilized to extend through a channel 302 of a bottom portion 300 of the housing 124 to mount fasteners (e.g. screws) to various components of the disk drive being manufactured. Examples of these components for which drivers are utilized to mount screws include covers, disk clamps, voice coil motors (VCMs), printed circuit board assemblies (PCBAs), components of the head disk assembly (HDA), components of head stack assembly (HSA), etc. However, presently utilized screw insertion assemblies do not utilize a low aspect ratio screw finder 100, a screw sensor 130 attached to the tube 120, a computer 132, and an air source 134 and an air switch 136 connected to the low aspect ratio screw finder 100.

As an example, a screw 102 may be sucked down the tube 120 by the applied vacuum, and magnetic sensor 130 attached to the tube and coupled to computer 132 (wired or wirelessly), senses that a screw 102 has passed and transmits a signal to computer 132 indicating that a screw 102 has passed by. Based upon this, computer 132 coupled to air switch 136 (wired or wirelessly), commands the opening of air switch 136 such that high pressure air from the air source or vacuum 134 is applied to the low aspect ratio screw finder 100 to cause the low aspect ratio screw finder to move to a mating position. In this way, the low aspect ratio screw finder 100 is moved to a mating position in which a surface of a screw guide plunger 200 is positioned to abut against the screw 102 (as can be seen in FIG. 1B) to maintain the screw 102 in an optimal orientation for movement from the tube 120 into the bottom portion 300 of the screw insertion assembly housing 124 where it can be driven by the driver 118 to connect components of the disk drive to be manufactured. It should be appreciated that air source/vacuum 134, air switch 136, and low aspect ratio screw finder 100 are suitably connected one another for high pressure air transmission.

Further, as will be described in more detail hereinafter, the low aspect ratio screw finder 100 includes a retraction mechanism that includes a magnet coupled to the screw guide plunger 200 and a metallic material of a screw guide sleeve 202 such that when it is time for the screw 102 to be screwed into components of the disk drive, computer 132 instructs air switch 136 to be turned off such that the screw guide plunger 200 is retracted into the screw guide sleeve 202 to a retracted position to allow the screw 102 to enter the bottom portion 300 of the screw insertion assembly housing 124 and to allow the driver 118 to extend through the channel 302 of the screw insertion assembly housing 124 to engage the head of the screw and to connect components of the disk drive. Alternatively, when it is time for the screw 102 to be screwed into components of the disk drive, computer 132 instructs air source/vacuum 134 to be turned to a vacuum or suction mode to provide a vacuum to the screw guide sleeve 202 such that the screw guide plunger 200 is retracted into the screw guide sleeve 202 to a retracted position to allow the screw 102 to enter the bottom portion 300 of the screw insertion assembly housing 124 and to allow the driver 118 to extend through the channel 302 of the screw insertion assembly housing 124 to engage the head of the screw and to connect components of the disk drive.

Figure 2A:
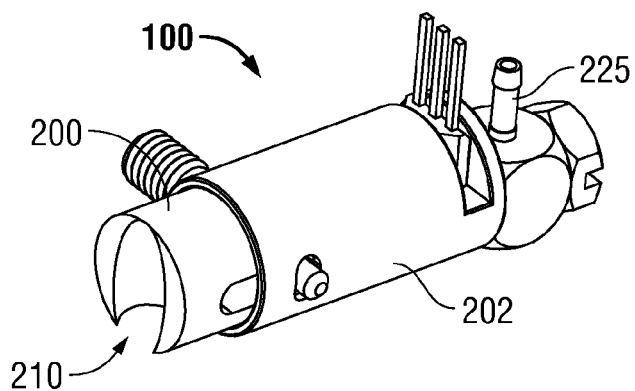
FIG. 2A is a perspective view of a low aspect ratio screw finder, according to one embodiment of the invention.
Figure 2B:
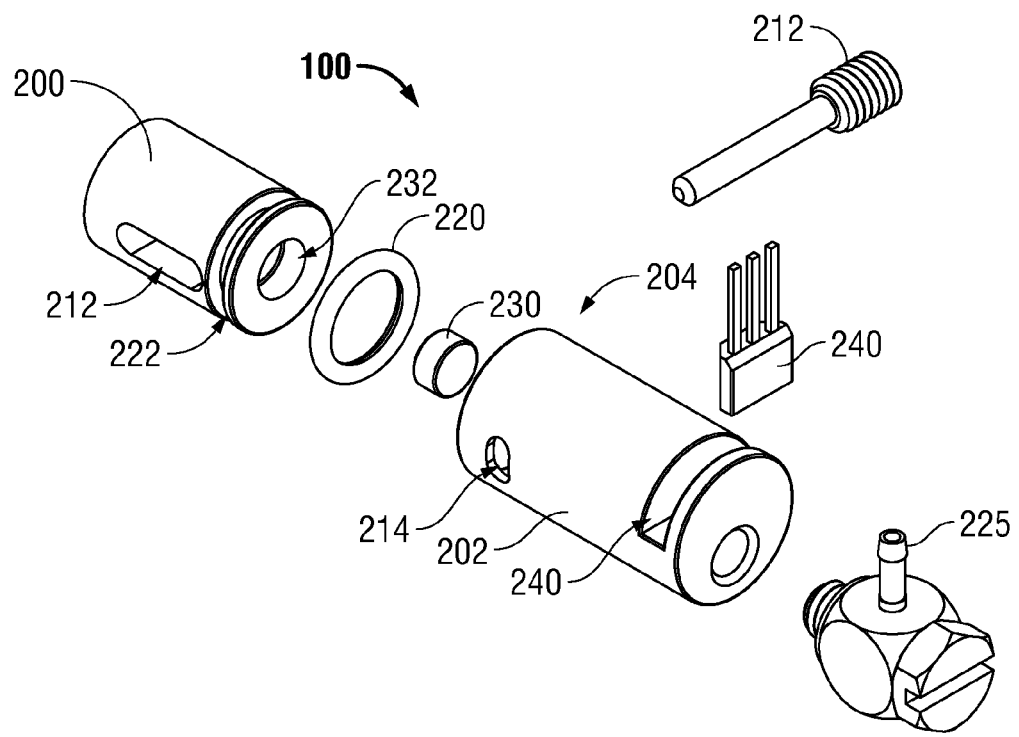
FIG. 2B is an exploded view of a low aspect ratio screw finder, according to one embodiment of the invention.

With additional reference to FIGS. 2A-B, embodiments of the low aspect ratio screw finder 100, according to embodiments of the invention, will be hereinafter described. The low aspect ratio screw finder 100 includes a screw guide 200 (hereinafter referred to as a screw guide plunger), a screw guide sleeve 202, and a retraction mechanism 204. The screw guide plunger 200 is approximately cylinder shaped with an approximately Y-shaped channel 210 and includes a pair of aligned slots 212. With brief reference to FIG. 3A, the tube 120 of the screw insertion assembly 115 intersects with the Y-shaped channel 210 of the screw guide plunger 200 at an angle such that the screw guide plunger 200 provides a surface within the Y-shaped channel 210 to abut against the screw 102 to maintain the screw 102 in an optimal orientation for movement from the tube 120 into the channel 302 of the bottom portion 300 of the screw insertion assembly housing 124.

In one embodiment, the screw guide plunger 200 is coupled internally to the screw guide sleeve 202 for movement relative to the screw guide sleeve 202. In particular, the screw guide plunger 200 can be coupled to the internal portion of the cylindrically shaped screw guide sleeve 202 by a blocking finder 212 that extends through aligned slots 214 of the screw guide sleeve 202 and through the slots 212 of the screw guide plunger 200. A rubber O-ring 220 may be coupled to an internal channel 222 around the screw guide plunger 200 to provide a seal between the screw guide plunger 200 and the screw guide sleeve 202. Further, an elbow fitting air source connector 225 is mounted to the screw guide sleeve 202 to provide high pressure air and/or vacuum to the low aspect ratio screw finder 100 from the air switch 136 via a suitable connector. As previously described, air source/vacuum 134 is connected through air switch 136 to the low aspect ratio screw finder 100 to provide high pressure air and/or vacuum thereto under the control of computer 132.

The low aspect ratio screw finder 100 may also include a retraction mechanism 204 to retract the screw guide plunger 200 towards the screw guide sleeve 202 to allow the screw 102 to enter the channel 302 of the bottom portion 300 of the screw insertion assembly housing 124 and to allow the driver 118 to extend through the bottom portion of the screw insertion assembly to engage the head of the screw 102 in order to connect components of the disk drive being manufactured. Therefore, the screw guide plunger 200 easily moves in and out of the screw guide sleeve 202.

In one embodiment, the retraction mechanism 204 may include a magnet 230 that is coupled to an inner hole 232 of the screw guide plunger 200 and also includes a metallic material (not shown) internal to the screw guide sleeve 202 to attract the magnet 230 such that the screw guide plunger 200 is retracted into the screw guide sleeve 202 to a retracted position. This may occur after the computer 132 has commanded the air switch 136 to an off position such that high pressure air from the air source 134 is no longer provided to the low aspect ratio screw finder 100. Alternatively, the computer 132 may command the air source/vacuum 134 to provide a vacuum to the screw guide sleeve 202 such that the screw guide plunger 200 is retracted into the screw guide sleeve 202 to the retracted position.

The screw guide sleeve 202 may generally be formed by a plastic material with an interior coating of metallic material. In one embodiment, the plastic material may include a TURCITE material. The screw guide sleeve 202 may also be formed purely of a metallic material. The screw guide plunger may be formed from a plastic or a metallic material. Also, the screw guide sleeve 202 may include a slot 240 in which a sensor 242 is mounted to sense the magnet 230. As an example, the sensor 240 may be a Hall Effect sensor. The sensor 240 may be wired or wirelessly connected to the computer 132. When the magnet 230 is sensed, the sensor 240 communicates to the computer 132 that the retraction mechanism 204 is in the retracted position. Alternatively, if the sensor 240 does not sense the magnet 230, the sensor 230 transmits to the computer 132 that the screw guide plunger 200 is in the mating position such that the surface of the screw guide plunger is positioned to abut against the screw 102 to maintain the screw 102 in the optimal orientation.

Figure 3A:
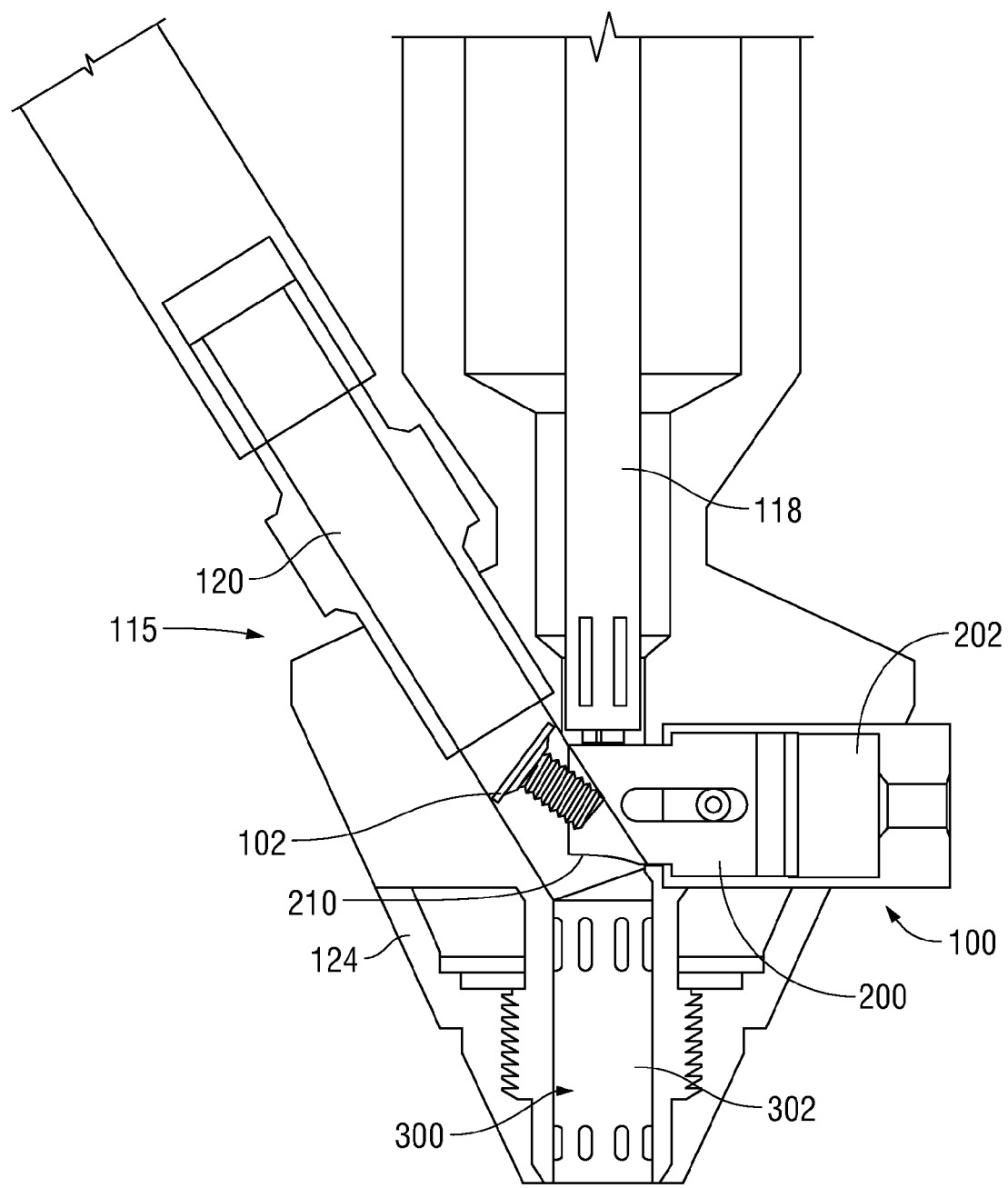
FIG. 3A is a side view of a low aspect ratio screw finder in a mating position to maintain the screw in an optimal orientation, according to one embodiment of the invention.

Therefore, as previously described, the low aspect ratio screw finder 100 has a mating position and a retracted position. With particular reference to FIGS. 1A and 3A, when a screw 102 is vacuum sucked down tube 120, it passes by magnetic sensor 130 which communicates to computer 132 that it has sensed the screw 102 coming down tube 120. In response, computer 132 ensures that low aspect ratio screw finder 100 assumes the mating position. In particular, computer 132 commands air switch 136 to turn to the on position such that air source 134 transmits high pressure air through air switch 136 to the low aspect ratio screw finder 100. In particular, the air switch 136 provides high pressure air into the screw guide sleeve 202 to cause the screw guide plunger 200 to move into the mating position such that the surface of the Y-shaped interior portion 210 is positioned to abut against the screw 102. In this way, as can be seen in FIG. 3A, screw 102 is maintained in an optimal orientation for movement from the tube 120 into the channel 302 of bottom portion 300 of the screw insertion assembly housing 124.

Figure 3B:
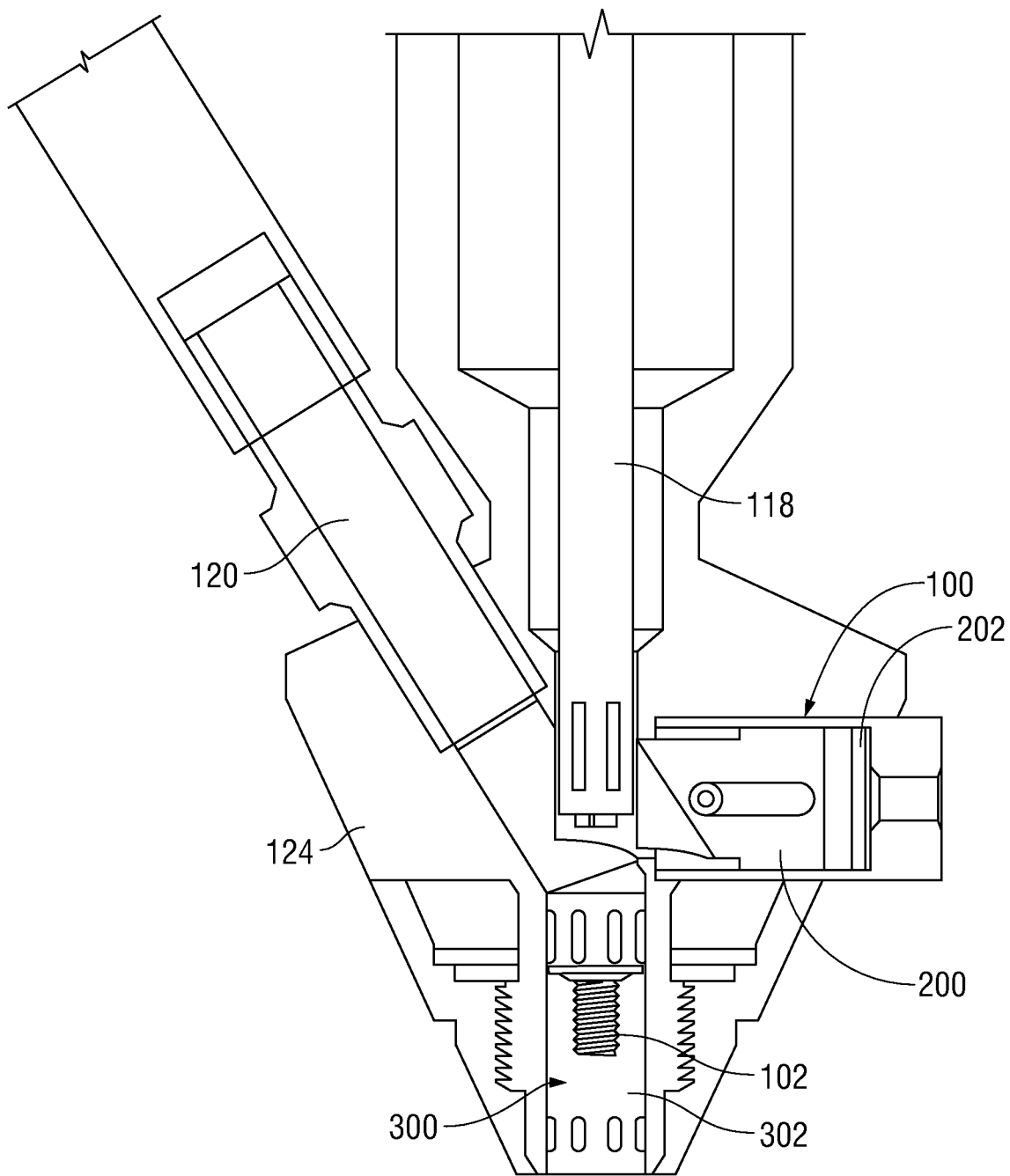
FIG. 3B is a side view of a low aspect ratio screw finder in a retracted position to allow the screw to enter the bottom portion of the screw insertion assembly, according to one embodiment of the invention.
Figure 3C:
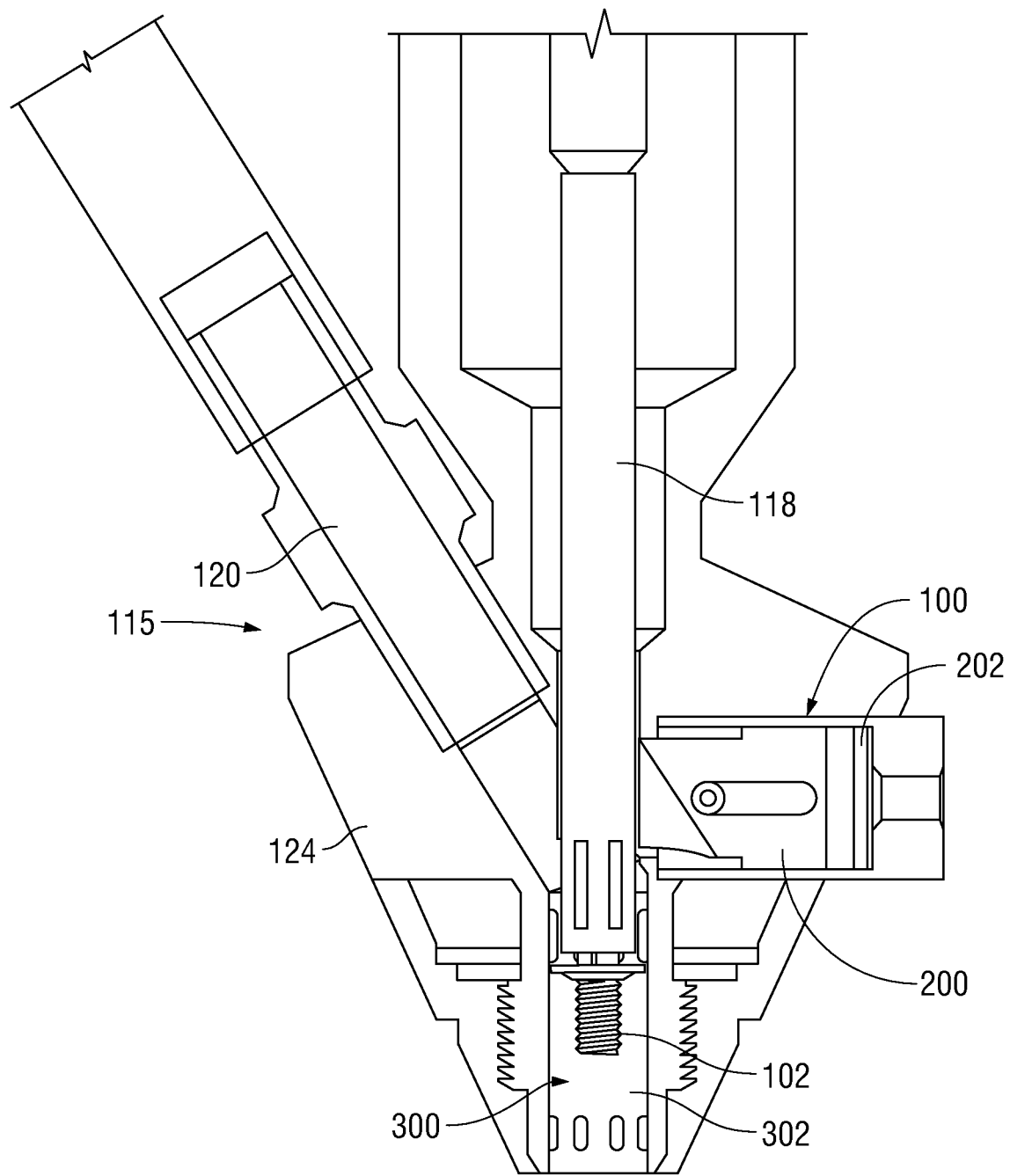
FIG. 3C is a side view of a low aspect ratio screw finder in a retracted position to allow the screw to enter the bottom portion of the screw insertion assembly and to allow the driver to engage the head of the screw, according to one embodiment of the invention.

With additional reference to FIGS. 3B-3C, when the computer 132 determines that it is time for the driver 118 to drive the screw 102 into components of the disk drive for manufacture, computer 132 commands that air switch 136 be switched to the off position such that air source/vacuum 134 no longer provides high pressure air into the low aspect ratio screw finder 100. Because of this, the magnet 230 coupled to the screw guide plunger 200 is retracted back by the internal metallic material of the screw guide sleeve 202 towards the retracted position, as can be seen in FIGS. 3B-3C. Alternatively, when it is time for the screw 102 to be screwed into components of the disk drive, computer 132 instructs air source/vacuum 134 to be turned to a vacuum or suction mode to provide a vacuum to the screw guide sleeve 202 such that the screw guide plunger 200 is retracted into the screw guide sleeve 202 to a retracted position to allow the screw 102 to enter the bottom portion 300 of the screw insertion assembly housing 124, as can be seen in FIGS. 3B-3C.

As can be seen in FIG. 3B, the screw guide plunger 200 is retracted back into the screw guide sleeve 202 such that screw 102 falls into the channel 302 of the bottom portion 300 of the screw insertion assembly housing 124. In this way, the driver 118 can likewise move into the channel 302 of the bottom portion 300 of the screw insertion assembly housing 124.

Further, as can be seen in FIG. 3C, the driver 118 is allowed to extend into the channel 302 of the bottom portion 300 of the screw insertion assembly housing 124 to engage the head of the screw 102 in order to drive the screws to the components of the disk drive being manufactured.

After the screws have been inserted into the appropriate components of the disk drive, the driver 118 may be retracted and when the next screw is loaded into tube 120 and sensed by sensor 130, computer 132 may once again command applying air pressure from the air source 134 to the screw guide sleeve 202 such that the low aspect ratio screw finder 100 assumes the mating position so that the screw guide plunger 200 provides a surface to abut against the screw 102 to maintain the screw 102 in an optimal orientation for movement from the tube 120 into the bottom portion 300 of the screw insertion assembly housing 124 for manufacture, as previously described (see FIG. 3A).

Although, screws have been described as the example fastener for use by the driver 118 to connect components of the disk drive, it should be appreciated that a wide variety of different types of fasteners such as bolts, rivets, clamps, pins, etc., may be utilized.

The low aspect ratio screw finder 100 may be used to successfully feed low aspect ratio screws to a driver for the assembly of disk drive components. Examples of these types of low aspect screws include screws in which the diameter of the screw head versus the length of the screw is 1.2, 1.0, or less. These types of low aspect ratio screws are becoming more common in the assembly of small-form-factor mobile and/or enterprise disk drives. The low aspect ratio screw finder 100 may also cut down the required time for setting up the tooling assembly for such low aspect ratio screws. The low aspect ratio screw finder 100 may additionally serve as a significant yield enabler for the screw driving process as current tooling requires highly skilled technicians to perform the set-up for low aspect screws. Moreover, the low aspect ratio screw finder fits very well for presently used drive assembly locations as it drops in as a replacement for current screw driving processes and only requires minor modifications for accommodation with complete screw bit finders and drivers.

Additionally, because the low aspect ratio screw finder 100 reduces jammed, slanted, or tilted screws, this reduces scraping during the assembly process such that the resulting generation of less particles significantly reduces contamination. Moreover, because screw jams are reduced which causes improper assembly (e.g. high screws, stripped screw heads, etc.), the assembly yield of disk drives may be significantly increased. Furthermore, the downtime of the assembly process in which maintenance technicians are utilized to determine screw feeding locations and to correct screw orientation due to the use of low aspect ratio screws is significantly reduced. Accordingly, the low aspect ratio screw finder 100 provides many benefits in the assembly of disk drives and other products that utilize screws or other fasteners with low aspect ratios.

As has been previously described, computer 132 is connected (e.g., wirelessly and/or wiredly connected) to the magnetic sensor 130, the air switch 136 and the low aspect ratio screw finder 100, such that when a screw 102 is vacuum sucked down tube 120, it passes by magnetic sensor 130, which communicates to computer 132 that it has sensed the screw 102 coming down tube 120. In response, computer 132 ensures that the low aspect ratio screw finder 100 assumes the mating position. In particular, computer 132 commands air switch 136 to turn to the on position such that air source 134 transmits high pressure air through the air switch to the low aspect ratio screw finder 100. Thus, the air switch 136 provides high pressure air into the screw guide sleeve 202 to cause the screw guide plunger 200 to move into the mating position such that the surface of the Y-shaped interior portion 210 of the screw guide plunger 200 is positioned to abut against the screw 102.

Further, when the computer 132 determines that it is time for the driver 118 to drive the screw 102 into components of the disk drive for manufacture, computer 132 commands that air switch 136 be switched to the off position such that air source 134 no longer provides high pressure air into the low aspect ratio screw finder 100. Because of this, the magnet 230 coupled to the screw guide plunger 200 is retracted back by the internal metallic material of the screw guide sleeve 202 into the retracted position, such that screw 102 may fall into the channel 302 of the lower portion 300 of the screw insertion assembly housing 124. Alternatively, when it is time for the screw 102 to be screwed into components of the disk drive, computer 132 instructs air source/vacuum 134 to be turned to a vacuum or suction mode to provide a vacuum to the screw guide sleeve 202 such that the screw guide plunger 200 is retracted into the screw guide sleeve 202 to a retracted position to allow the screw 102 to enter the bottom portion 300 of the screw insertion assembly housing 124 and to allow the driver 118 to extend through the channel 302 of the screw insertion assembly housing 124.

In this way, the driver 118 can likewise move into the channel 302 of the bottom portion 300 of the screw insertion assembly housing 124 to engage the head of the screw 102 in order to insert it into the components of the disk drive to be manufactured.

After the screw has been inserted into the appropriate components of the disk drive, the driver 118 may be retracted and when the next screw is loaded into tube 120 and sensed by sensor 130, computer 132 may ensure that the low aspect ratio screw finder 100 assumes the mating position once again.

These previous-described functions may be implemented by computer software/firmware/middleware etc. of the computer 132. However, it should be appreciated that a wide variety of electronic devices may be utilized to perform these functions such as various types of circuitry, processors, controllers, etc., with displays and/or sound devices.

For purposes of the present specification, it should be appreciated that the terms "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

What is claimed is:

1. A low aspect ratio screw finder for receipt and optimal alignment of a screw, the low aspect ratio screw finder is for use in conjunction with a complete screw bit assembly including a screw insertion assembly and a driver, the low aspect ratio screw finder comprising:
    a screw guide, wherein a tube of the screw insertion assembly intersects with the screw guide at an angle;
    a screw guide sleeve, wherein the screw guide is a plunger coupled to the screw guide sleeve for movement in and out of the screw guide sleeve, and wherein the screw guide plunger provides a surface to abut against the screw to maintain the screw in an optimal orientation for movement from the tube into a bottom portion of the screw insertion assembly;
    a retraction mechanism to retract the screw guide plunger into the screw guide sleeve to allow the screw to enter the bottom portion of the screw insertion assembly and to allow the driver to extend through the bottom portion of the screw insertion assembly to engage the head of the screw; and
    an air switch coupled to the screw guide sleeve, the air switch configured to provide air into the screw guide sleeve to cause the screw guide plunger to move to a mating position such that the surface of the screw guide plunger is positioned to abut against the screw to maintain the screw in the optimal orientation for movement from the tube into the bottom portion of the screw insertion assembly.

2. The low aspect ratio screw finder of claim 1, wherein the air switch is coupled to an air source that transmits high pressure air to the air switch based upon a command from a computer.

3. The low aspect ratio screw finder of claim 1, wherein the retraction mechanism includes a magnet coupled to the screw guide plunger.

4. The low aspect ratio screw finder of claim 3, wherein the screw guide sleeve further comprises a sensor to sense the magnet, such that when the magnet is sensed, the sensor indicates to a computer that the retraction mechanism is in the retracted position.

5. The low aspect ratio screw finder of claim 4, wherein if the sensor does not sense the magnet, the sensor indicates to the computer that the screw guide plunger is in a mating position such that the surface of the screw guide plunger is positioned to abut against the screw to maintain the screw in the optimal orientation.

6. The low aspect ratio screw finder of claim 1, wherein the screw guide sleeve comprises a plastic material with an interior coating of a metallic material.

7. The low aspect ratio screw finder of claim 6, wherein the plastic material includes TURCITE material.

8. The low aspect ratio screw finder of claim 1, wherein the screw includes a low aspect ratio.

9. A method for receipt and optimal alignment of a screw in a complete screw bit assembly that includes a screw insertion assembly and a driver, the method comprising:
    inserting a screw guide into the screw insertion assembly, wherein a tube of the screw insertion assembly intersects with the screw guide at an angle;
    coupling the screw guide into a screw guide sleeve for movement in and out of the screw guide sleeve, wherein the screw guide is a plunger and provides a surface to abut against the screw to maintain the screw in an optimal orientation for movement from the tube into a bottom portion of the screw insertion assembly;
    retracting the screw guide plunger into the screw guide sleeve to allow the screw to enter the bottom portion of the screw insertion assembly and to allow the driver to extend through the bottom portion of the screw insertion assembly to engage the head of the screw; and
    providing air into the screw guide sleeve to cause the screw guide plunger to move to a mating position such that the surface of the screw guide plunger is positioned to abut against the screw to maintain the screw in the optimal orientation for movement from the tube into the bottom portion of the screw insertion assembly.

10. The method of claim 9, wherein providing air is based upon a command from a computer.

11. The method of claim 9, wherein the screw guide plunger includes a magnet.

12. The method of claim 9, wherein the screw guide sleeve comprises a plastic material with an interior coating of a metallic material.

13. The method of claim 12, wherein the plastic material includes TURCITE material.

14. The method of claim 9, wherein the screw includes a low aspect ratio.

* * * * *